March 18, 1969  KIYOHARU MURAKAMI  3,433,340
CLUTCH SERVOCONTROL APPARATUS FOR AUTOMOTIVE VEHICLES
Filed May 22, 1967  Sheet _1_ of 2
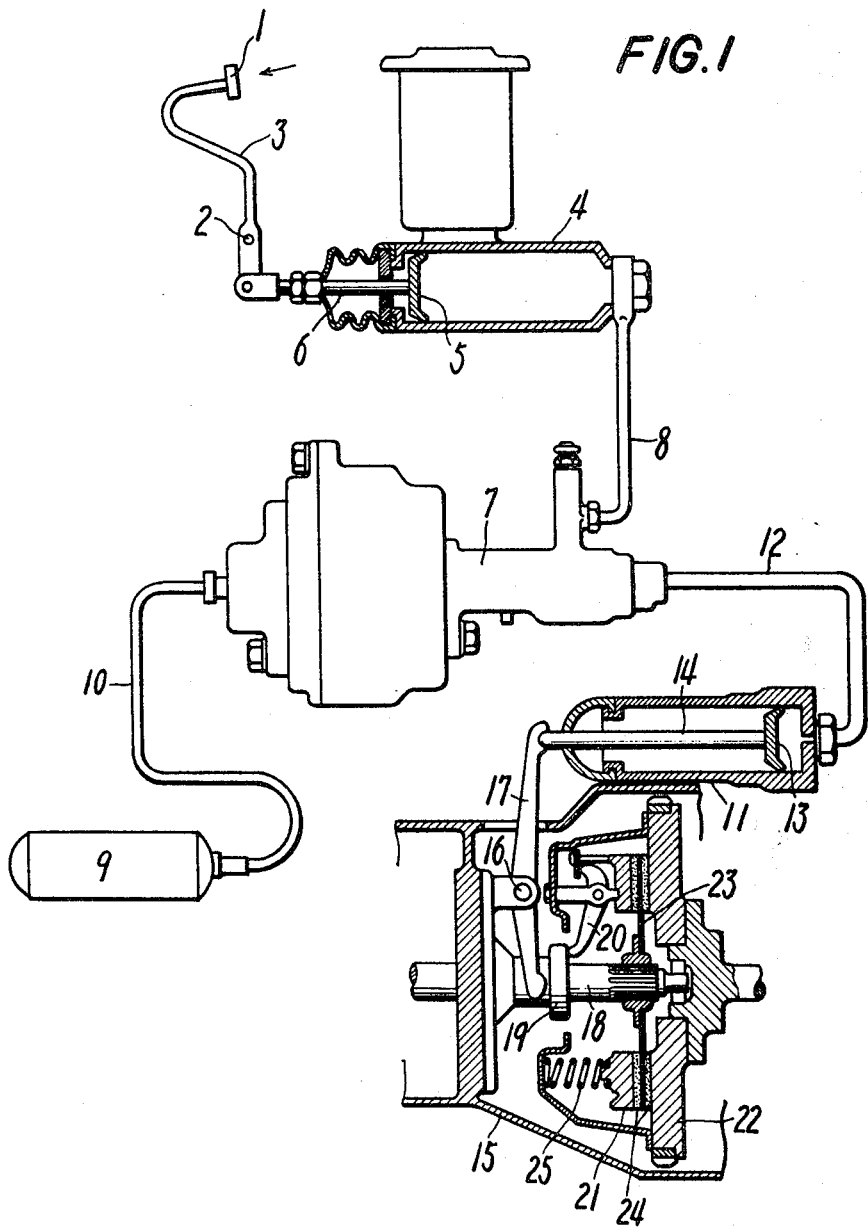
Inventor
NIYOHARU MURAKAMI
By Mason, Fenwick & Lawrence
Attorneys

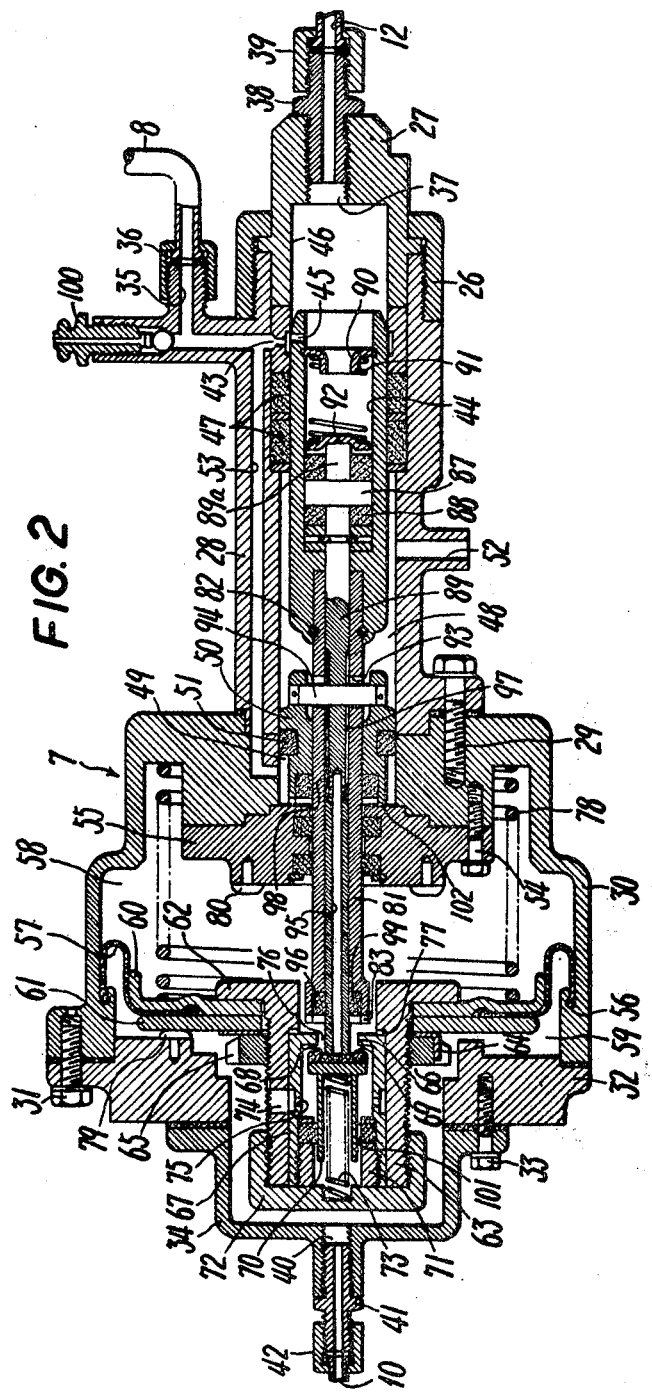

United States Patent Office 3,433,340
Patented Mar. 18, 1969

3,433,340
CLUTCH SERVOCONTROL APPARATUS FOR AUTOMOTIVE VEHICLES
Kiyoharu Murakami, Neyagawa, Japan, assignor to Kabushiki Kaisha Daikin Seisakusho, Neyagawa, Osaka, Japan
Filed May 22, 1967, Ser. No. 640,087
Claims priority, application Japan, Aug. 3, 1966, 41/51,182
U.S. Cl. 192—91     3 Claims
Int. Cl. F16d 13/44, 25/00, 19/00

ABSTRACT OF THE DISCLOSURE

In hydraulic clutch operating system for automobiles, the hydraulic transmission line connecting a clutch master-cylinder to a clutch slave-cylinder is intermediately provided with two pistons fitted into subcylinder and movable cylinder. Said pistons are connected to move integrally. Said movable cylinder is fitted into main-cylinder, to which the oil pressure coming from master-cylinder is fed through movable cylinder. Piston and power piston rods connected to movable cylinders are disposed in pressure-air-operated servomotor chamber, a valve regulating pressure-air flowing to servomotor diaphragm is operated to change direction of flow by piston rod operated by pressure difference between said pistons, while pressure air imparted to diaphragm works on movable cylinder when clutch is disengaged, thereby reducing treadling force of clutch pedal.

---

This invention relates primarily to a clutch servo-control apparatus for automotive vehicles and generally to a clutch servocontrol apparatus which can be applied to a clutch operating system adapted for use in rail cars and similar other vehicles driven by a diesel engine or other prime movers.

A conventional widely employed clutch operating system employs a hydraulic pressure connection between the clutch pedal and the clutch release fork for activating the release fork for engaging and disengaging the clutch.

A primary object of this invention is to reduce treadling force by adding automatic operation force deriving its power source from fluid pressure such as pressure air to the treadling force in proportion to the degree of the treadling force of the driver given to the clutch pedal in the clutch operating system of the knid described in which fluid pressure such as oil pressure is utilized.

Another object of the invention is to facilitate the operation of a clutch pedal by reducing in a substantial degree the reaction of power of restitution from a clutch unit upon the clutch pedal during the treadling of the clutch pedal.

As described, the invention makes it possible to reduce the reaction of the treadling force applied to the clutch pedal and of power of restitution from the clutch unit upon treadling, minimize the fatigue of a driver due to frequent operation of a clutch and ensure the safety of the driver.

Particularly in the case of vehicles such as a large-sized bus having a clutch unit which requires transmission of powerful torque, the invention makes it possible to make smooth operation of a clutch unit. These and other objects and novel features of the invention will become apparent from the following description taken in conjunction with the accompanying drawings in which:

FIG. 1 shows in diagrammatic form a clutch operating system to which a clutch servocontrol apparatus according to the invention is applied; and FIG. 2 is a longitudinal sectional view of the clutch servocontrol apparatus of the invention and shows a clutch being completely connected.

In FIG. 1 the reference numeral 1 indicates a clutch pedal the lever 3 of which is supported by a shaft 2, and the other end of the lever 3 is pivotally connected to an end of a piston rod 6 connected to a piston 5 inside a master cylinder 4, 7 indicates a clutch servocontrol apparatus that constitutes the essential part of the invention. The clutch servocontrol apparatus 7 and the master cylinder 4 are connected to each other by means of an oil pressure control signal conduit 8 for transmission of pressure fluid such as oil pressure. The clutch servo unit 7 is further connected through an air conduit 10 to an air reservoir 9 that contains the pressure air produced by an air compressor mounted on the vehicle, and is actuated in proportion to the degree of treadling of a clutch pedal 1, as will be presently described, 11 indicates a slave cylinder which is connected through an oil pressure power conduit 12 to said clutch servo unit 7. Transmission of oil pressure is carried out between the slave cylinder 11 and the master cylinder 4 or a main cylinder inside the clutch servo unit 7, which main cylinder will be presently described. Inside the slave cylinder 11 is disposed a piston 13 which actuates a clutch fork member 17 through a piston rod 14 by said transmission of oil pressure, said clutch fork member 17 being pivotally connected to a clutch housing 15 by means of a shaft 16, and moves a clutch release bearing 19 on a driving shaft 18 in an axial direction. The moving of the clutch release bearing 19 is immediately transmitted to a clutch release lever 20 within the clutch housing 15 and by the actuation of the clutch release lever 20 a clutch facing plate 24 on a clutch plate 23 disposed between a pressure plate 21 and an engine flywheel 22 is released against the action of a spring 25 in a well-known manner or the pressure plate 21 under the pressure of the spring 25 presses the clutch facing plate 24 against the engine flywheel 22 thereby effecting interrupted operation of clutch.

The clutch servo unit 7 is structurally shown in FIG. 2. The housing structure of the clutch servo unit 7 comprises, in combination, a cylindrical body 28 having a cap 27 mounted thereto by a box nut 26, a right servomotor housing 30 mounted to said body 28 by bolts 29, a left servomotor housing end plate member 32 fixed to said right housing 30 by bolts 31 and a left servomotor housing 34 fixed to said left servomotor housing end plate member 32 by bolts 33. The oil pressure conduit 8 connecting the master cylinder 4 previously described to the clutch servo unit 7 just described above is connected to an oil pressure signal inlet 35 formed in the body 28 by a box nut 36, and an oil pressure conduit 12 connecting the clutch servo unit 7 to a slave cylinder 11 is connected to an oil pressure power signal outlet 37 formed in the cap 27 by means of a nipple 38 and a box nut 39. The pressure air conduit 10 connecting the air reservoir 9 to the clutch servo unit 7 is connected to a pressure air inlet 40 formed in the left servomotor housing 34 by means of a nipple 41 and a box nut 42. Inside the cap 27 fixed to the body 28 is provided a main cylinder 46 having a first oil hole 43 leading to an oil inlet 35 communicating with the oil pressure conduit 8. Into the cylinder 46 is fitted a movable cylinder 44 which opens and closes said first oil hole 43 by means of a valve port 45 formed on one portion of the cylindrical wall of the cylinder 44. Accordingly, for making division between the main cylinder 46 and the movable cylinder 44 is disposed an oil seal 47 by which to secure oil tightness between the two. Furthermore, the inside of the main cylinder 46 is formed into a subcylinder 49 that serves also an air compartment 48 communicating with the inside of the right servomotor housing 30. Inside said subcylinder 49 is disposed a first piston 50, said piston 50 being oil-sealed on the periphery thereof by a seal ring 51. Next, the air compartment 48 is provided with an air port 52 communicating with the atmosphere and the subcylinder 49 is provided with an oil pressure subpassage 53 communicating with the oil inlet 35. The end surface of the subcylinder 49 as shown is closed with a right servomotor housnig end plate 55 secured to the right servomotor housing 30 by bolts 54.

On the other hand, the inner space enclosed with the right servomotor housing 30, the left servomotor housing end plate 32 and the left servomotor housing 34 is divided into a right servomotor chamber 58 and a left servomotor chamber 59 by a diaphragm 57 having the periphery thereof fixed to a fitting portion 56 formed within the right servomotor housing 30. A sleeve portion 63 forming a flange 62 at one end thereof is mounted to the holes of diaphragm holder discs 60 and 61 by means of a nut 65 locked with a lock washer 64, said diaphragm holder discs 60 and 61 clamping the inner periphery of the diaphragm 57 from both sides of the discs in such a manner that the peripherally threaded cylindrical portion of the sleeve portion 63 is positioned on the side of the left servomotor chamber 58, and a valve chest 67 forming a valve seat 66 is fitted into the hole of the sleeve portion 63. The valve chest 67 further forms a movable valve seat 68 in the center thereof, and is provided on the periphery thereof with a poppet valve 69 in opposition to said valve seat 66. A valve body 70 having said movable valve seat 68 and said poppet valve 69 faced toward the side of the right servomotor chamber 58 is supported by a support ring 71 threadedly secured to the hole of the valve chest 67 so as to permit free movement of the valve body 70 in an axial direction, and a coil spring 73 is interposed between an end cap 72 threadedly secured to the tail end of the sleeve portion 63 and the valve body thereby biasing the movable valve seat 68 toward the valve seat 66. The sleeve portion 63 is provided in the radial direction of its body with one air passage 74, and the valve chest 67 is provided in the wall thereof with an air hole 75 communicating constantly with the air passage 74, thereby causing the left servomotor chamber 59 to communicate with the valve seat 67, and the valve seat 66 is provided with a hole 76 for use as an air passage.

The inner hole of the sleeve portion 63 into which the valve chest 67 is fitted is provided with a stopper 77 and prevents the valve chest 67 from protruding beyond the sleeve portion 63 into the right servomotor chamber 58. Furthermore, the diaphragm 57 is given a restitution habit of moving the diaphragm 57 to the side of the left servomotor chamber 59 by a coil spring 78 one end of which is seated on the right inside wall of the right servomotor chamber 58 and the other of which is seated on the diaphragm holder disc 60, so as to keep the diaphragm holder disc 61 pressed against a stopper 79 protrudedly formed in the end plate 32 of the left servomotor chamber while the valve seat 66 is opened. In contrast thereto, on the side of the right servomotor chamber 58 a stopper 80 is protrudedly formed in the right servomotor chamber end plate 55 is disposed in opposition to the flange face 62 of the sleeve portion 63 for the prevention of the diaphragm 57 from moving to the right. One end of a power piston rod 81 formed of a pipe is connected by a tie ring 82 to the left end of the movable cylinder 44 previously described.

Said power piston rod 81 passes longitudinally through said first piston 50 and the right servomotor chamber end plate 55 so that it may oil tightly and freely move in an axial direction, and the left end of the power piston rod 81 projects into the right servomotor chamber 58 and is provided on the foremost end surface with a radial air slit 83 which is disposed in opposition to the surface of the valve seat 66, said surface facing the side of the right servomotor chamber. A second piston 87 made suitably smaller in cross sectional area (active area of oil pressure) than the first piston 50 is fitted together with its packing 88 into the movable cylinder 44, and a piston rod 89 of the second piston 87 passes longitudinally through the leftside bottom of the movable cylinder 44 and moves freely longitudinally through the inside hole of the power piston rod 81. On that end portion 89a of said piston rod 89 which is in the movable cylinder, said piston rod being termed a balancing piston rod, the balancing piston rod 89 is loaded by a coil spring 91 resting through a seat disc 92 and a spring seat 90 secured to the end of the movable cylinder 44. Accordingly, the balancing piston rod 89 is given a restitution habit of projecting toward the movable valve seat 68 from the end of the power piston rod 81 through which the balancing piston rod 89 passes. A longitudinally elongated slot 93 is formed on that portion of the power piston rod 81 which is positioned inside an air compartment 48, and to the portion where the balancing piston rod 89 is revealed by said slot is secured a cross pin 94 directly intersecting the piston rod 89 and both ends of the cross pin 94 are fixed to the tail end of the first piston 50 for actuating the first piston 50 and the second piston 87 integrally and for shifting the pistons in an axial direction with respect to a combination of the movable cylinder 44 and the power piston rod 81. Furthermore in the balancing piston rod 89 is formed an air escape 95 passing longitudinally through the rod 89 and which is disposed in opposition to the movabe valve seat 68 and extends from one end of the piston rod 89 to about the middle thereof and the open end of said air escape 95 disposed in opposition to the movable valve seat 68 is formed at a movable valve port 96, and the end of the air escape 95 communicates through a cross hole 98 with an exhaust slit 97 provided on the periphery in about the middle of the balancing piston rod 89, said exhaust slit 97 communicating through the slot 93 formed in the power piston rod 81 with an air compartment 48. The reference numeral 99 in the drawings shows a seal member interposed between the inside hole of the power piston rod 81 and the periphery of the balancing piston rod 89; 100 designates a bleeder plug for blowing off air which is formed in an oil passage 43; and 101 designates an air bleeder provided in a support 71 for the purpose of making the actuation of a valve body 70 free. The first piston 50 is provided on the end surface thereof with a protrusion 102 so as not to bring the end surface of the piston 50 into contact entirely with the bottom surface of a subcylinder 49.

When in the structure described a clutch 1 is treadled in a direction of arrow and a piston 5 of a master cylinder 4 is moved to the right in FIG. 1, the oil pressure in the master cylinder 4 is increased and flows from an oil inlet 35 shown in FIG. 2 into the main cylinder 46 and the subcylinder 49 of the clutch servo unit 7. Then the oil pressure in the main cylinder 46 and the subcylinder 49 is increased and the oil in the main cylinder 46 flows from an oil outlet 37 through an oil pressure pipe 12 to a slave cylinder 11, but as the reaction of a clutch works directly in the slave cylinder 11, the oil pressure in the main cylinder 46 and the subcylinder 49 becomes equal to the oil pressure in the master cylinder 4. Accordingly, the oil pressure in the main cylinder 46 works on the second piston 87 and pushes the balancing piston rod 89 to the left in FIG. 2, while on the other hand the oil pressure in the subcylinder 49 pushes the first piston 50 to the right in FIG. 2. That is to say, forces acting to move the piston in a direction opposite to each other is produced in said two cylinders 46 and 49. In this case the first piston 50 is larger in the active area of oil pressure than the second piston 87, and accordingly, when the oil pressure of the same value working on both pistons 50 and 87 in a direction opposite to each other is caused to work on the pistons 50 and 87, the force to move the first piston 50 of a large cross sectional area in the right direction is considered to overcome the force to move the second piston 87 of a small cross sectional area in the left direction. But the balancing piston rod 89 that integrally connects the first piston 50 and the second piston 87 through a cross pin 94 is placed under the influence of a coil spring 91 to move the rod 89 in the left direction, so that when the value of oil pressure in the master cylinder 4 is below a certain value, a combination of the force of the coil spring 91 and the force to work on the second piston 87 is designed to become greater than the force working on the first piston 50, and accordingly the balancing piston rod 89 stays still in the position shown in FIG. 2, and the oil fed from the master cylinder 4 is supplied through the main cylinder 46 to the slave cylinder 11 without being utilized in the main cylinder 46 for any purpose and a clutch release fork member 17 starts moving in a direction of disengaging a clutch. When the clutch release fork member 17 starts said actuation, the pressure of a spring 25 to cause a pressure plate 21 to press a clutch facing 24 against an engine flywheel 22 increases the oil pressure in the master cylinder 46 and subcylinder 49 in the form of reaction to the treadling of the clutch pedal and increases the pressure applied to the first piston 50 and the second piston 87, so that, when the oil pressure exceeds a predetermined value, the force to move the first piston 50 to the right produced by the oil pressure working on the first piston 50 becomes stronger than a combination of the force to move the second piston 87 to the left by the oil pressure working on the second piston 87 and the resilience of a coil spring 91 to push the piston 67 to the left, with the result that the oil pressure applied to the first piston 50 causes the balancing piston rod 89 together with said two pistons 50 and 87 to start moving to the right in FIG. 2, whereupon the pushing of the right side of the slot 93 by cross pin 94 causes the movable cylinder 44 to start moving to the right thereby causing a valve port 45 to move to the right and to tend to close on oil hole 43.

Now, when the movement of said balancing piston rod 89 is shown by way of an equation, force $P_1$ to move the balancing piston rod 89 to the right in FIG. 2 is:

$$P_1 = a_1 \times P_o \quad (1)$$

and force $P_2$ to move the balancing piston rod 89 to the left is:

$$P_2 = a_2 \times P_o + P_s \quad (2)$$

wherein $a_1$ represents the cross sectional area of a first piston rod 50; $a_2$, the cross sectional area of a second piston 87; $P_o$, oil pressure; and $P_s$ represents the resilience of a coil spring 91.

Since the oil pressure $P_o$ in this case is equal in both Equations 1 and 2, and $a_1$ is larger than $a_2$, an equation naturally follows:

$$a_1 \times P_o > a_2 \times P_o \quad (3)$$

but the Equation 2 represents the addition of the resilience $P_s$ of the coil spring 91, and accordingly while the oil pressure is low, the following relation can be established:

$$P_1 < P_2 \quad (4)$$

and when the oil pressure is raised to a certain value, the following relation is established:

$$P_1 = P_2 \quad (5)$$

and when the oil pressure exceeds a certain value, the following relation is established:

$$P_1 > P_2 \quad (6)$$

In this way the actuation of the balancing piston rod 89 is started.

In the state in FIG. 2 prior to that in which the balancing piston rod 89 starts said actuation, a movable valve port 96 formed at the end of the balancing piston rod 89 strikes against a movable valve seat 68 and is closed, and the movable valve port 96 pushes the valve body 70 into movement via the movable seat 68 against the action of the coil spring 73, disengaging the poppet valve 68 from a valve seat 66 and causes the right servomotor chamber 58 and the left servomotor chamber 59 to communicate with each other via valve chest 67, thereby filling the right servomotor chamber 58 and the left servomotor chamber 59 with a pressure air fed from a pressure air inlet 40. In the state described no pressure difference is produced that works on the servomotor diaphragm 57.

When the force working on the first piston 50 and the second piston 87 is placed in the state expressed by the Equation 6 by treadling the clutch pedal 1, and the balancing piston rod 89 starts moving to the right in FIG. 2, the valve body 70 that was pushed by the movable valve port 96 of the balancing rod 89 moves by the action of the coil spring 73 to the right together with the balancing rod 89, whereby the poppet valve 69 rests on the valve seat 66, the communication between the right servomotor chamber 58 and the left servomotor chamber 59 is cut and then the movable valve port 96 is disengaged from the movable valve seat 68 by the movement of the balancing piston rod 89 to the right. Thus the right servomotor chamber 58 communicates from the movable valve port 96 of the balancing piston rod 89 through an air escape 95, a cross hole 98, an exhaust slit 97, and then from a slot 93 of a power piston rod 81 with an air compartment 48 and finally through an air hole 52 formed in the air compartment 48 with the atmosphere. Accordingly, the pressure air in the right servomotor chamber 58 starts being blown off. On the other hand, since pressure air is constantly being fed from a pressure air inlet 40 to the left servomotor chamber 59, the pressure in the left servomotor chamber 59 is becoming stronger than that in the right servomotor chamber 58, with the result that the servomotor diaphragm 57, because of difference in pressure between the two chambers 58 and 59, begins moving to the side of the right servomotor chamber 58 against the resilience of the coil spring 78, and a valve chest 67 also begins moving to the right, which valve chest 67 is mounted to the servomotor diaphragm 57 by means of the sleeve portion 63. As the end of the power piston rod 81 is disposed in opposition to that side of a valve seat 66 which faces the right servomotor chamber 58 and which is formed in said valve chest 67, said surface of the valve seat 66 strikes against the end of the power piston rod 81 and the force applied to the servomotor diaphragm 57 by the pressure air in the left servomotor chamber 59 pushes the power piston rod 81 into movement to the right. At the end of the power piston rod 81 is radially formed an air slit 83 as previously described, and accordingly even when the valve seat 66 strikes against the end of the power piston rod 81, the air in the right servomotor chamber 58, as described, continues being discharged from the movable valve port 96 through said air slit 83. As a result, the movable cylinder 44 connected through a tie ring 82 to the power piston rod 81 moves likewise to the right, moves the valve port 45 as described thereby blocking the oil passage 43 and cutting the communication between the main cylinder 46 and the oil pressure 35. Accordingly, the oil fed from the master cylinder 4 to the clutch servo unit 7 flows through an oil pressure passage 53 to the subcylinder 49 alone, applies pressure to the first piston 50 and causes the balancing piston rod 89 to continue moving and at the same time applies pressure to the oil in the main cylinder 46 by use of the second piston 87, and the movable cylinder 44 also continues moving to the right by the air pressure applied to the servomotor diaphragm 57, applies pressure to the oil in the main cylinder 46 and further pressure by use of said second piston 87, feeds the oil in the cylinder 46 to the slave cylinder 11, moves a piston 13 in the slave cylinder 11 to the left in FIG. 1 and turns the clutch release fork around a shaft 16 thereby disengaging the clutch.

As described, the invention reduces the treadling force of clutch pedal and relieves a car driver of his burdens in treadling operation of the clutch pedal of the hydraulically operated clutch control device by adding air pressure working on the servomotor diaphragm to the force produced by the treadling operation.

When treadling of the clutch pedal is discontinued before the clutch is completely disengaged, feeding of oil pressure to the subcylinder 49 stops in the first place, and accordingly the balancing piston rod 89 stops by the reaction of the clutch transmitted from the slave cylinder 11 to the main cylinder 46. Being pushed by the servomotor diaphragm 57, the power piston rod 81 moves slightly even after the balancing piston rod 89 has stopped, but said movement of the power piston rod 81 made after the balancing piston rod 89 has stopped protrudes the movable valve port 96 at the end of the balancing piston rod 89 from the end of the power piston rod 81, and the movable valve seat 68 of the valve body 70 strikes against the movable port 96 thereby blocking the movable valve port 96 and stopping exhaust from the right servomotor chamber 58. Thereafter the air pressure working on the servomotor diaphragm 57 moves the valve seat 66 to the right to disengage a poppet valve 69 from the seat 66, whereby the pressure air in the left servomotor chamber 59 flows into the right servomotor chamber 58 and the air pressure between both servomotor chambers 59 and 58 tends to balance. At this juncture, as the servomotor diaphragm 57 is placed under the action of the coil spring 78 to push said diaphragm 57 into movement toward the left servomotor chamber 59, said air pressure pushes the servomotor diaphragm 57 back to the side of the servomotor chamber 59 immediately before the air pressure tends to balance, with the result that the poppet valve 69 again rests on the valve seat 66, the air in the right servomotor chamber 58 therefore again is kept in the chamber 58 and the servomotor diahragm 57 stops after all in its former position, the balancing piston rod 89 and power piston rod 81 also come to a standstill, said state of standstill being maintained by the balance between the oil pressure working on the movable cylinder 44 and on the second piston 87 and the air pressure working on the servomotor diaphragm 57 and the oil pressure working on the first piston 50, and engagement and disengagement of clutch also stop in a state corresponding to that in which treadling of clutch pedal 1 has been suspended. Opening and closing of said valve seat 66 are carried out quite instantaneously.

When the treadling force applied to the clutch pedal 1 is released, the oil pressure working on the first piston 50 is reduced, so that the second piston 87 is pushed toward the left by the oil pressure of the main cylinder 46 on which the resilience of the spring 25 of clutch directly acts, thereby to move the balancing rod 89, press the movable valve port 96 against the movable valve seat 68, move the valve body 70 to the left, disengage the poppet valve 69 from the valve seat 66, stop exhaust from the right servomotor chamber 58 and at the same time bring the right servomotor chamber 58 into communication with the left servomotor chamber 59, move the servomotor diaphragm 57 to the side of the left servomotor chamber 59 by the action of the coil spring 78, and ultimately push the movable cylinder 44 and the second piston 87 back to the left by the oil pressure in the main cylinder 46. Therefore the power piston rod 81 and the balancing piston rod 89 also are pushed back to the left and, as shown in FIG. 2, the holder disc 61 of the servomotor diaphragm 57 stops against the stopper 79 of the left servomotor chamber end plate 32, and the protrusion 102 formed in the first piston 50 strikes against the bottom plate of the subcylinder 49 and stops the balancing piston rod 89 and the second piston 87 together with the first piston 50, the movable cylinder 44 opens the oil hole 43 at the oil passage valve port 45, bringing the main cylinder 46 into communication with the master cylinder 4 and causing the oil returning from the slave cylinder 11 to flow back to the master cylinder 4. Thus the piston 5 in the master cylinder 4 is pushed to the left and a clutch is returned to the state in which it was before the clutch pedal 1 was treadled, and ultimately the clutch is reinstated in its completely engaged position shown in the drawing. Furthermore, said movable cylinder 44 ceases to be influenced by the oil pressure in the main cylinder 46 with the oil valve port 45 kept communicating with the oil hole 43 and stops together with the power piston rod 81 in the position shown in FIG. 2.

So-called halfway clutch operation in which transmission of torque is effected by stopping the clutch pedal 1 in the middle of the clutch moving in the direction of its engagement and by causing a clutch facing 24, an engine flywheel 22 and a pressure plate 21 to keep sliding in a certain degree can be obtained in the same manner of operation as that in which the engagement of clutch is suspended in the middle of treadling.

As described, the clutch servo device of the invention makes it possible to effect clutch operation in exactly the same manner as the foot-operated clutch of a conventional type is operated which permits engagement and disengagement of clutch and operation of halfway clutch, etc. at will, greatly reduces the treadling force of clutch pedal to the desired value, and is highly effective especially when applied to the clutch of a large-size bus, truck, rail car, etc., which require transmission of powerful torque.

What is claimed is:
1. A clutch operating system for use in an automotive vehicle, said system comprising a clutch pedal, a hydraulic master cylinder connected to said clutch pedal for actuation by said clutch pedal, a clutch servocontrol apparatus, a control signal conduit connecting said master cylinder to an oil pressure control signal inlet on said servocontrol apparatus, a slave cylinder connected to a clutch release fork member for operating the clutch release fork member for moving the release fork member for causing engagement or disengagement of a clutch plate, a power signal conduit connecting an oil pressure power signal outlet on said servocontrol apparatus to said slave cylinder for enabling activation of said slave cylinder by a power output pressure signal from said servocontrol, said servocontrol apparatus including a main cylinder having said power signal outlet on one end thereof, an oil passage extending from a wall of said main cylinder to communicate with said oil pressure signal inlet, a movable cylinder mounted for movement in said main cylinder, an oil passage valve port on said movable cylinder for opening and closing said oil passage of said main cylinder to said pressure signal inlet, said main cylinder including a subcylinder on the end opposite said power signal outlet, an oil pressure subpassage communicating said subcylinder with said oil pressure signal inlet, a first piston fitted for movement in said subcylinder and positioned to be biased toward said power signal outlet by oil pressure from said oil-pressure subpassage, a second piston having a smaller area than said first piston and fitted for movement in said movable cylinder in a direction away from said power signal outlet by oil pressure in said main cylinder, a balancing piston rod connected to said first piston, connection means connecting said first piston to said balancing piston rod spring biasing said first piston and said balancing piston rod in said direction away from said power signal outlet, a hollow power piston rod connected on one end to said movable cylinder and having its other end extending into a servomotor, said servomotor comprising a left chamber connected to a source of pressurized air and a right chamber separated by a movable diaphragm, a valve chest on said movable diaphragm including a valve body having a movable valve seat, said balancing piston rod being mounted for movement in said power piston rod and a valve port formed in the end of said balancing piston rod facing said valve seat, a poppet valve connecting said left chamber to said right chamber, a spring means biasing said diaphragm toward said left chamber and an exhaust passage extending through said balancing piston rod to communicate with the atmosphere so that an oil pressure control signal introduced into said control signal inlet moves said first piston, said second piston and said balancing piston rod toward said power signal out- let so as to close said poppet valve to cause air pressure to build up in said left chamber to cause said diaphragm to shift said movable cylinder toward said power signal outlet to provide a power signal for activating said slave cylinder for actuating said clutch release work.

2. The invention of claim 1 wherein said servocontrol includes a main body, a cap connected to one end of said main body, said main cylinder being formed inside said cap, said subcylinder being formed on the end of said body opposite the end to which said cap is connected and wherein said means connecting said first and second pistons comprises a cross pin extending through a slot in said power piston rod.

3. The invention of claim 1 wherein said valve chest is coaxial with the axis of said diaphragm.

References Cited

UNITED STATES PATENTS

| 2,141,678 | 12/1938 | Andres | 192—91 |
| 3,172,335 | 3/1965 | Brooks et al. | 91—376 X |

BENJAMIN W. WYCHE, *Primary Examiner.*

U.S. Cl. X.R.

91—376; 60—54.6